United States Patent [19]

Kusano

[11] Patent Number: 4,835,755

[45] Date of Patent: May 30, 1989

[54] RECORDING DISK REPRODUCING APPARATUS HAVING HIGH-RESOLUTION A/D CONVERTER

[75] Inventor: Satoshi Kusano, Saitama, Japan

[73] Assignee: Pioneer Electronic Corporation, Tokyo, Japan

[21] Appl. No.: 61,362

[22] Filed: Jun. 15, 1987

[30] Foreign Application Priority Data

Jun. 13, 1986 [JP] Japan ................. 61-137723

[51] Int. Cl.[4] ............................................. G11B 7/00
[52] U.S. Cl. ......................................... 369/44; 369/45
[58] Field of Search ............................ 369/44, 45, 46; 250/201 DF

[56] References Cited

U.S. PATENT DOCUMENTS

| | | | |
|---|---|---|---|
| 4,286,318 | 8/1981 | Immink et al. | 369/44 |
| 4,482,987 | 11/1984 | Okada et al. | 369/44 |
| 4,603,410 | 7/1986 | Yoshida | 369/45 |
| 4,628,497 | 12/1986 | Bierhoff | 369/44 |
| 4,726,004 | 2/1988 | Takasago et al. | 369/46 |

FOREIGN PATENT DOCUMENTS

| | | |
|---|---|---|
| 0138275 | 4/1985 | European Pat. Off. . |
| 0217460 | 4/1987 | European Pat. Off. . |
| 3541002 | 5/1986 | Fed. Rep. of Germany . |
| 3618720 | 12/1986 | Fed. Rep. of Germany . |

*Primary Examiner*—Donald McElheny, Jr.
*Attorney, Agent, or Firm*—Sughrue, Mion, Zinn, Macpeak & Seas

[57] ABSTRACT

A recording disk reproducing apparatus employing simplified digital servo control for lower-cost, more stable operational control of the apparatus. At least one of a focusing servo loop, a tracking servo loop, a spindle servo loop, and a time base servo loop employs digital conversion of an analog error signal for processing in a microprocessor. The analog-to-digital conversion circuitry has an input-output characteristic which varies in accordance with error signal level, enabling a reduction in the number of bits of A/D output necessary, and reducing cost.

6 Claims, 2 Drawing Sheets

RECORDING DISK REPRODUCING APPARATUS HAVING HIGH-RESOLUTION A/D CONVERTER

BACKGROUND OF THE INVENTION

1. Field of the Invention

The present invention relates to a recording disk reproducing apparatus, and particularly relates to an optical recording disk reproducing apparatus such as an optical video disk player, and the like.

2. Description of the Background Art

An optical recording disk reproducing apparatus reproduces recorded information on a recording surface of an information recording disk (hereinafter simply referred to as a disk) by using a pickup for radiating a light beam onto the recording surface as to detect the recorded information by means of, for example, reflected light from the recording surface. In such a recording disk reproducing apparatus, the pickup is movable in the radial direction of the disk, and the rotational driving of the disk is controlled by a spindle servo device, so that the movement of an information detecting light spot of the pickup relative to the disk is controlled.

The apparatus further is provided with a focusing servo device for controlling the position of the focus of the light beam of the pickup so as to form the information detecting light spot on the recording surface of the disk. The apparatus further is provided with a tracking servo device for controlling the light spot so as to make the light spot accurately trace a recording track which is formed on the recording surface, for example, spirally.

There has been proposed a recording disk reproducing apparatus employing a so-called digital servo device for generating an error signal corresponding to a difference between a target value and a control amount on the basis of the output signal of the pickup so as to perform phase compensation, or the like, of the error signal in a digital manner. In such an apparatus, an A/D (analog-to-digital) converter for converting the analog error signal into a digital one is used. The higher the number of bits of the output data of the A/D converter, the higher the resolution, so that highly accurate controlling can be performed. However, as a result, the operational processing becomes complicated and the required processing time increases, so that the sampling frequency cannot be made sufficiently high. Consequently, there is deterioration of the phase characteristic of the servo, making stability poor as well as resulting in an increase in the number of the constituent elements of the A/D converter, thereby increasing the cost.

For the foregoing reasons, the conventional recording disk reproducing apparatus using a digital servo device is disadvantageous in that it is impossible to perform stable control with high accuracy, and in that the cost is high.

SUMMARY OF THE INVENTION

In view of the foregoing disadvantages in the conventional apparatus as described above, it is an object of the present invention to provide a recording disk reproducing apparatus in which stable control can be attained with high accuracy and in which the cost can be reduced.

In the recording disk reproducing apparatus according to the present invention, at least one of the focusing servo means, the tracking servo means, the spindle servo means, and the time base servo means includes analog-to-digital converting means for analog-to-digitally converting an error signal, in order to perform control on the basis of data obtained by operational processing of an output of the analog-to-digital converting means, the analog-to-digital converting means having an input-output characteristic which varies in accordance with the level of the error signal.

DETAILED DESCRIPTION OF A PREFERRED EMBODIMENT

Referring to accompanying drawings, one preferred embodiment according to the present invention now will be described.

Figure 1:
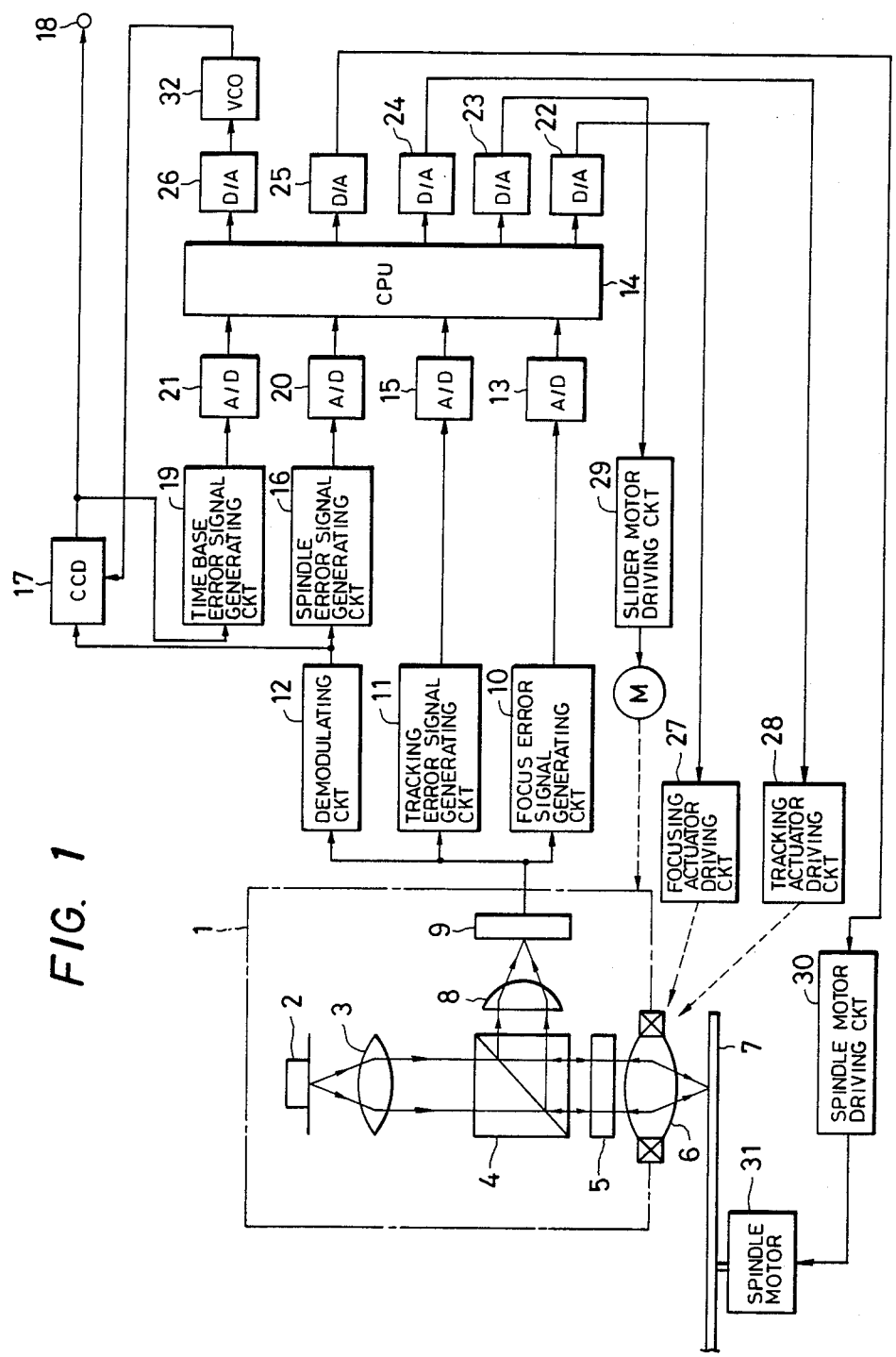
FIG. 1 is a block diagram showing the recording disk reproducing apparatus according to the present invention.

In FIG. 1, after being collimated through a collimator lens 3, the laser light emitted from a laser beam source 2 such as a laser diode or the like provided in a pickup 1 is focused to be an information detecting light spot on a recording surface of a disk 7 through a beam splitter 4, a ¼ wavelength plate 5 for varying the direction of polarization, and a focusing lens 6. After being passed through the focused lens 6 and the ¼ wavelength plate 5, reflected light from the recording surface of the disk 7 is made to impinge onto the beam splitter 4 so that the reflected light containing information is separated from the incident light. The reflected light separated by the beam splitter 4 is made to impinge onto a quartering detector 9 through a cylindrical lens 8. The outputs from the quartering detector 9 are respectively supplied to a focusing error signal generating circuit 10, a tracking error signal generating circuit 1, and a demodulating circuit 12.

In the focusing error signal generating circuit 10, an analog focusing error signal is generated corresponding to the direction and amount of displacement of the focus of the laser beam emitted from the pickup 1. After being converted to a digital signal by an A/D converter 13, the digital focusing error signal is supplied to a microcomputer 14.

In the tracking error signal generating circuit 11, an analog tracking error signal is generated corresponding to the direction and amount of a displacement of the spotlight relative to a recording track, by means of, for example, a three beam method. After being converted to a digital signal by an A/D converter 15, the digital tracking error signal is supplied to the microcomputer 14.

In the demodulating circuit 12, an RF signal including recording information is generated on the basis of the output from the quartering detector 9, and subjected to FM-demodulation processing so as to reproduce a video signal. The output of the demodulating circuit 12 is supplied to a spindle error signal generating circuit 16, and at the same time is supplied to a video output terminal 18 as well as to a time base error signal generating circuit 19 through a CCD (charge coupled device) 17.

In the spindle error signal generating circuit 16, a spindle error signal is generated corresponding to a phase difference between a reference signal having a predetermined frequency and a horizontal synchronizing signal included in the output of the demodulating circuit 12.

In the time base error signal generating circuit 19, an analog time base error signal is generated corresponding to a phase difference between a reference signal having a predetermined frequency and a horizontal synchronizing signal included in the output of the CCD 17. After being converted to a digital signal by A/D converters 20 and 21 respectively, the digital spindle error signal and the digital time base error signal are supplied to the microcomputer 14.

In the microcomputer 14, which is constituted by a processor, a ROM (read-only memory), a RAM (random-access memory), etc., the respective digital error signals supplied thereto are processed in accordance with predetermined equalizer characteristics by the processor which is arranged to operate in accordance with a program stored in advance in the ROM, and then supplied to D/A converters 22 through 26.

The digitized focusing error signal which is subjected to phase compensation processing is supplied to the D/A converter 22. The output of the D/A converter 22 is supplied to a focusing actuator driving circuit 27 to drive a focusing actuator (not shown) for positioning the focusing lens 6 in the pickup 1 in the direction of the optical axis thereof.

The digitized tracking error signal which is supplied to phase compensation processing is supplied to the D/A converter 23. The output of the D/A converter 23 is supplied to a tracking actuator driving circuit 28 so as to drive a tracking actuator for positioning the focusing lens 6 in the pickup 1 in the direction perpendicular to the optical axis thereof.

A DC component of the digitized tracking error signal is supplied to the D/A converter 24. The output of the D/A converter 24 is supplied to a slider motor driving circuit 29 so as to send a slider (not shown) for carrying the pickup 1 in the radial direction of the disk 7).

The digitized and phase-compensated spindle error signal is supplied to the D/A converter 25. The output of the D/A converter 25 is supplied to a spindle motor driving circuit 30 so as to drive a spindle motor 31 for rotationally driving the disk 7.

The digitized and phase-compensated time base error signal is supplied to the D/A converter 26. The output of the D/A converter 26 is used as a control signal for a VCO (voltage-controlled oscillator) 32. The oscillation output of the VCO 32 is supplied to a clock input terminal of the CCD 17 so as to vary a signal delay time in accordance with the time base error signal to correct the error in the time base of the reproduced signal.

Figure 2:
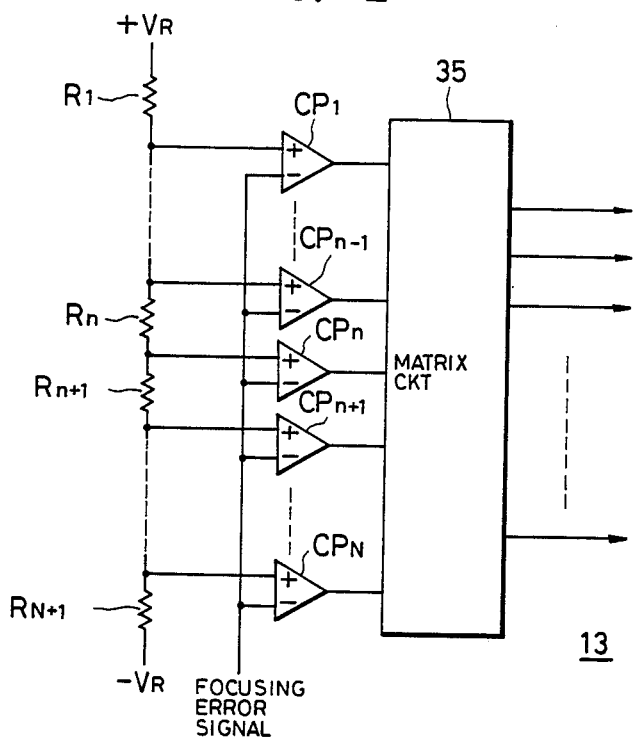
FIG. 2 is a diagram showing a specific circuit of the D/A converter 13 in the apparatus of FIG. 1.

FIG. 2 is a diagram showing a specific embodiment of the A/D converter 13. In the drawing, a focusing error signal is supplied to a negative input terminal of each of N comparators (N being an odd number), $CP_1, \ldots, CP_{n-1}, CP_{n+}, \ldots, CP_{n+1}, \ldots, CP_N$. (N+1) resistors, $R_1, \ldots, R_n, R_{n+1}, \ldots, R_{N+1}$, are connected in series between reference potential points $+V_R$ and $-V_R$. The serial junction points of the resistors $R_1 - R_{N+1}$ are connected to the respective positive input terminals of the comparators $CP_1 - CP_N$. Therefore, reference voltages different from each other are supplied to the respective positive input terminals of the comparators $C_1 - CP_N$, so that the instantaneous level of the focusing error signal can be discriminated by the respective outputs of the comparators $CP_1 - CP_N$. The respective outputs of the comparators $CP_1 - CP_N$ are supplied to a matrix circuit 35. The matrix circuit 35 generates digital data of a predetermined number of bits corresponding to the instantaneous level of the focusing error signal indicated by the respective outputs of the comparators $CP_1 - CP_N$.

Figure 3:
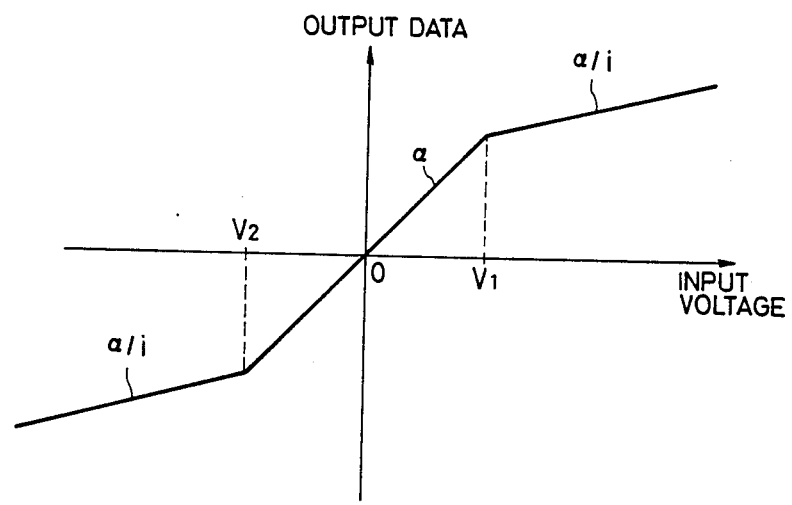
FIG. 3 is a graph showing a characteristic of the circuit of FIG. 2.

Of the resistors $R_1 - R_N$ serially connected between the reference potential points $+V_R$ and $-V_R$, the resistance value of each of the m resistors $R_1 - R_m$ successively connected to the reference voltage point $+V_R$ and the resistance value of each of the m resistors $R_{N+2-m} - R_{N+1}$ successively connected to the reference voltage point $-V_R$, are i-times (i being a real number larger than 1) as large as the resistance value of each of the (N+1−2m) resistors $R_{m-R_{N+1-m}}$ and the input-output characteristic of the A/D converter 13 is made non-linear, as shown in FIG. 3. That is, assuming that the gradient of the characteristic curve is $\alpha$ in the case where the input voltage is not higher than the voltage $V_1$ at the serial junction point between the resistors $R_m$ and $R_{m+1}$ and is not lower than the voltage $V_2$ at the serial junction point between the resistors $R_{N+1}$ and $R_{N+2-m}$, the gradient of the characteristic curve becomes $\alpha/i$ when the input voltage is higher than the voltage $V_1$ and when the input voltage is lower than the voltage $V_2$.

In the above-mentioned arrangement, the input dynamic range of the A/D converter 13 can be made larger without increasing the number of bits, and the conversion accuracy in the case of a small amplitude of the focusing error signal can be made high. As a result, since the amplitude of the error signal becomes small when a servo loop is in a closed state, it is possible to perform highly accurate control. Since the number of bits is not increased, the operational processing may be performed easily so that the sampling frequency can be made sufficiently high and therefore the servo phase characteristic can be made favorable for stable control. Further, the amplitude of the focusing error signal becomes large in the case of pull-in of the servo so that a quantization error acting as a disturbance in the servo loop becomes large, however, the pull-in characteristic is hardly influenced by a disturbance and the effect of the quantization error can be disregarded in practical use.

Although in the foregoing description, only the characteristic of the A/D converter 13 is made to be non-linear as shown in FIG. 3 in the above-mentioned embodiment, the characteristic of each of the A/D converters 15, 20 and 21 also can be made non-linear. Further, although the correction of the time base error is performed by the CCD 17 in the above-mentioned embodiment, the present invention is not limited to this structure, but is applicable to the case where the time base error is corrected by using a tangential actuator for moving an information detecting light spot in the extending direction of the recording track.

Further, the various digital servo devices provided in the apparatus in the embodiment described above are shown only by way of example, and as a matter of course the servo devices are not limited to those illustrated but can be modified in various ways.

As described above, the recording disk reproducing apparatus according to the present invention is arranged such that at least one of the focusing servo means, the tracking servo means, the spindle servo means, and the time base servo means includes an analog-to-digital converting means for analog-to-digitally converting an error signal for performing control on the basis of data obtained by operationally processing output data of the analog-to-digital converting means. The analog-to-digital converting means has an input-output characteristic which varies in accordance with the level of the error signal. Accordingly, the conversion accuracy can be made high without increasing the number of bits of the analog-to-digital converting means in order to perform control with high accuracy. Further, the operational processing can be simplified to attain a favorable phase characteristic, enabling stable control at reduced cost.

What is claimed is:

1. A recording disk reproducing apparatus comprising:
   a pickup for directing an optical beam onto a recording surface of a disk containing recorded information, and for detecting information recorded on said disk by detecting light reflected from said recording surface;
   an actuator for moving said pickup;
   focusing servo means, including means for generating a focus error signal, for controlling a position of a focus of said optical beam so as to form an information detecting light spot of said pickup on said recording surface of said information recording disk;
   tracking servo means, including means for generating a tracking error signal, for controlling a relative position of said information detecting light spot in the radial direction of said information recording disk;
   spindle servo means, including means for generating a spindle servo error signal, for controlling motion of said information detecting light spot relative to said information recording disk;
   analog-to-digital conversion means, provided in at least one of said focusing servo means, tracking servo means, and spindle servo means, for analog-to-digitally converting a corresponding one of said focus error signal, said tracking error signal, and said spindle servo error signal, and providing an output accordingly; and
   means for processing said analog-to-digital conversion means to generate a driving signal for driving said actuator, said analog-to-digital conversion means having an input-output characteristic with a first gradient within a range defined by first and second input voltage values, and a second gradient outside of said range.

2. A recording disk reproducing apparatus as claimed in claim 1, wherein said analog-to-digital conversion means comprises:
   a plurality of serially-connected resistors having different resistance values;
   a plurality of comparators each having their positive input terminals connected to a voltage division point between different pairs of said serially-connected resistors, said corresponding error signal being provided at a negative input terminal of each of said comparators; and
   a matrix circuit having its inputs connected to respective outputs of said comparators, wherein said matrix circuit generates digital data of a predetermined number of bits corresponding to an instantaneous level of said corresponding error signal.

3. A recording disk reproducing apparatus as claimed in claim 1, wherein at least two of said focusing servo means, said tracking servo means, and said spindle servo means each include a different one of said analog-to-digital conversion means.

4. A recording disk reproducing apparatus as claimed in claim 1, wherein each of said focus servo means, said tracking servo means, and said spindle servo means includes a different one of said analog-to-digital conversion means, said processing means receiving outputs of said focus servo means, said tracking servo means, and said spindle servo means for providing digital servo control for reproduction of said information recorded on said disk.

5. A recording disk reproducing apparatus as claimed in claim 1, further including time base servo means for correcting a time base error in said information recorded on said disk and detected by said pickup.

6. A recording disk reproducing apparatus as claimed in claim 5, further including a charge coupled device having its output coupled to an input of said time base servo means in a feedback manner, and a voltage-controlled oscillator coupled between an output of said time base servo means and an input of said charge coupled device.

* * * * *